INVENTORS
CLARE A. ALDRICH
JAMES P. JACOB
BY J E Beringer
their ATTORNEY

United States Patent Office 2,943,714
Patented July 5, 1960

2,943,714
HEAT ABSORBING UNIT USING SOLID MATERIAL OF HIGH SPECIFIC HEAT

Clare Aaron Aldrich and James P. Jacob, Dayton, Ohio, assignors to United Aircraft Products, Inc., Dayton, Ohio, a corporation of Ohio Filed May 31, 1956, Ser. No. 588,326

6 Claims. (Cl. 188—264)

This invention relates to capacitance systems of heat transfer, and has particular, although not limted, reference to aircraft brakes which, in the case of large aircraft, develop in use very high temperatures.

Cooling systems for brakes have heretofore been known but due to the increasing severity of the problem have become increasingly large and complex. Thus, braking systems are being developed wherein the place of heat absorption, the "heat sink," is removed from the wheel, and braking energy dissipated into a circulating fluid and being finally disposed of in the remotely located place of absorption.

The instant invention has in view the obviating of the need for circulating fluids, heat exchangers and all of the apparatus of remote systems, it being proposed to obtain equivalent cooling of the brake surface through a static capacitance medium housed close to the braking surface and preferably forming a part of the brake apparatus.

Another object of the invention is to improve upon clutches, disc brakes for aircraft and the like by providing therein self-contained heat absorbing means.

A further object of the invention is to provide a generally new method and apparatus for cooling involving the use of a material having the properties of high conductance and high specific heat.

A still further object of the invention is to provide for relatively safe, protected use of materials of high specific heat, as direct heat absorbers.

Other objects and structural details of the invention will appear from the following description when read in connection with the accompanying drawings, wherein.

Figure 1:
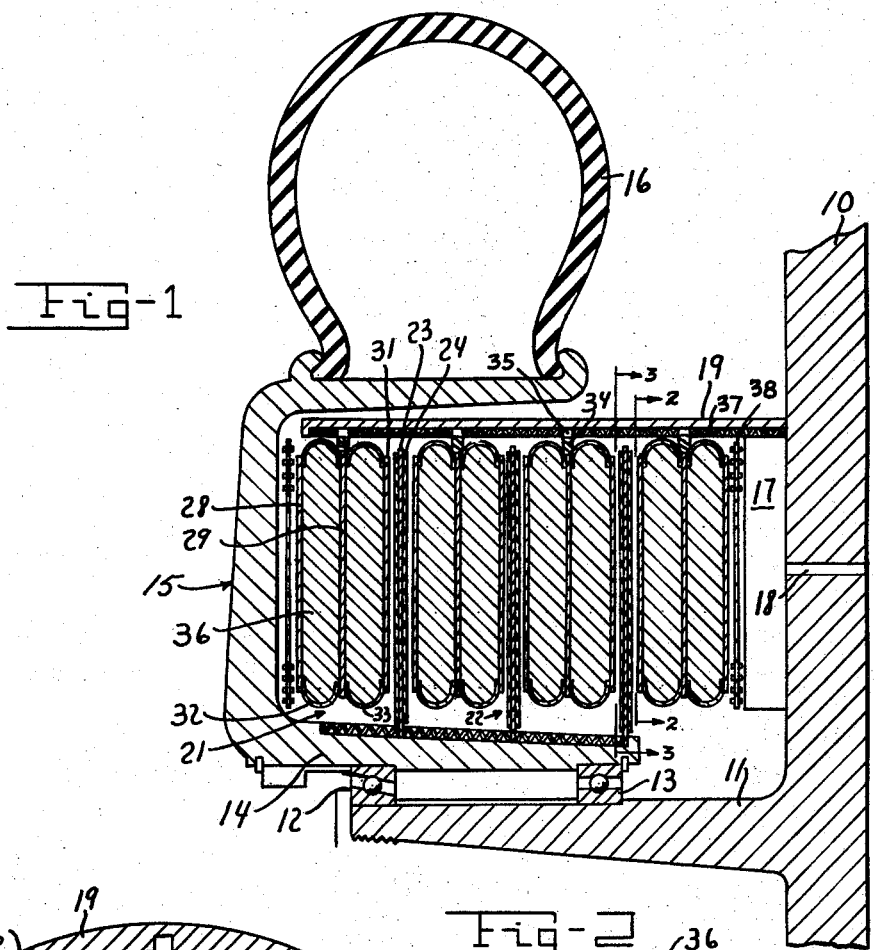
Fig. 1 is a detail view, partly diagrammatic, of an aircraft disc brake assembly constructed in accordance with the illustrated embodiment of the invention.
Figures 2, 3:
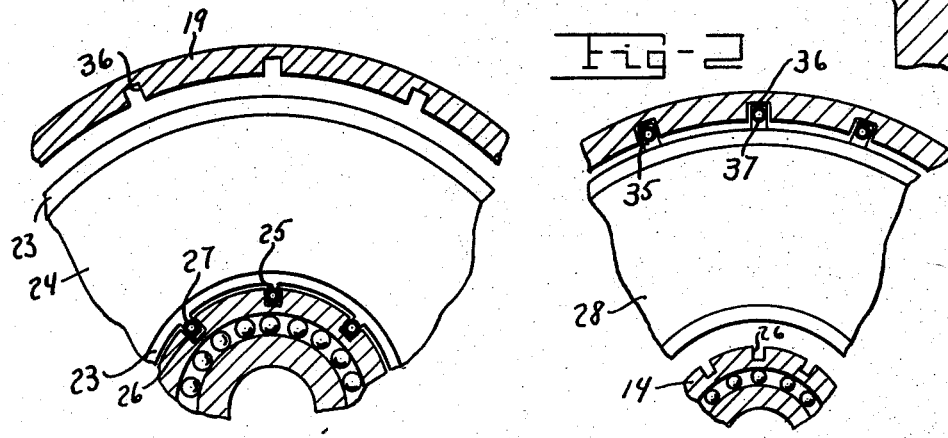
Fig. 2 is a fragmentary view in cross section, taken substantially along the line 2—2 of Fig. 1.
Fig. 3 is a fragmentary view in cross section, taken substantially along the line 3—3 of Fig. 1.

Referring to the drawing, an aircraft brake in accordance with the illustrated embodiment of the invention may comprise a relatively stationary strut 10 forming a part of the aircraft frame. From the strut 10 projects an axle 11 on which are spaced apart rolling bearings 12 and 13. The bearings 12 and 13 provide a mounting for the hub portion 14 of a wheel disc 15 mounting on its exterior a tire 16.

It will be understood that a part only of the wheel and brake assembly is shown, the structure as indicated being symmetrical about a horizontal center line which may be considered as passing through the bottom of Fig. 1.

The brake mechanism includes a hydraulic unit 17 which may be mounted on the strut 10 as shown and extensible outward or to the left as seen in Fig. 1, under the influence of hydraulic pressure, as selectively applied through a conduit 18. The unit 17 is surrounded by a cylinder 19 secured at its one end to the strut 10 and extending in surrounding parallel relation to the axle 11. Interposed between the internal wall of the cylinder 19 and the hub 14 of the wheel disc 15 is an assembly of discs comprised of alternating disc units 21 and 22. Each of the latter comprises an annular thrust transmitting plate 23 having attached to the opposite faces thereof brake lining material 24. The inner peripheral edge of the plate 23 is formed with circumferentially spaced apart lugs or projections 25 received in respective longitudinally extending slots 26 in the hub 14 of the wheel member. The units 22 accordingly are connected to the wheel for rotation therewith and for relative longitudinal sliding motion. Springs 27 are arranged in the slots 26 and tend to define normal longitudinal positions for the units 22, to which positions the units are returned when restored to the influence of the springs.

The units 21 each are constructed as pressure vessels, being composed of spaced apart plates 28, 29 and 31 interconnected by arcuate, relatively thin pieces 32 and 33 capable of limited flexing. The unit 21 may thus expand in a longitudinal sense relatively to the central plate 29, in the manner of a bellows, and will tend to restore itself to a normal contracted condition. The pieces 32 and 33 are joined to the plates 28, 29 and 31 in a manner to define secure, leak proof joint, the units 21 being thus sealed against communication between the interior and exterior thereof.

Secured to the exterior of each unit 21, as by attachment to the peripheral edge of the central plate 29, is an anchor ring 34. The ring 34 is formed with circumferentially spaced apart lugs or projections 35 received in respective longitudinal slots 36 in the cylinder 19. Springs 37 in the slots 36 tend to define a normal position for the several units 21. Under the influence of the respective sets of springs 27 and 37, the units 22 and 21 stand normally out of contact with one another. In response to energizing of the hydraulic unit 17, however, a pressure applying element 38 thrusts the first adjacent unit 21 outwardly, or to the left, in the course of which movement it encounters the first of the series of units 22. As extending motion of the hydraulic unit 17 continues, the described first encountered unit 22 moves outward and engages the second one in the series of units 21, this motion continuing until all of the units 21 and 22 are in intimate contacting relation to their respective adjacent units.

In the operation of the brake, the units 21 are relatively stationary, since they are keyed to the cylinder 19 which is rigidly mounted on the strut 10. The units 22 are keyed to the hub 14 of the wheel disc 15 and accordingly rotate with the wheel disc when the aircraft is in motion on the ground. The frictional engagement of the units 22 and of the units 21 tends of course to reduce the speed of and finally to halt rotation of the wheel disc 15.

The brake functions to convert kinetic energy into heat. In the case of slowing and stopping a large mass from high velocity movement, the generated heat may rise to destructively high values, as on the order of 1500° F. and higher.

It is proposed, in accordance with the instant invention, to absorb a large part of this generated heat into a material 36 contained within the bellows-like units 21. This material, for example lithium, has a high specific heat, has a high conductance, a low melting point and has a lower pressure at what may be termed operating temperatures. The material absorbs the heat generated in the brake by (a) temperature rise to its melting point, (b) melting and utilizing the heat of fusion, and (c) continued temperature rise to operating values. Thus, in the operation of the cooling system, the material 36 changes from a solid to a liquid state, with resulting increase in the rate of absorption.

The transfer of heat from the braking surface to the heat absorbing material thus is a direct one, effected with a minimum loss of efficiency by placing the heat absorbing material in immediate contacting relation to the braking surface. Further, since the material 36 has a slight or low vapor pressure increase in response to rising temperature, there is little or no tendency for internal pressures to distort the braking surface. The added volume required on account of expansion of the material 36 as it changes phase is accommodated by a corresponding extension of the container by virtue of a flexing of the pieces 32 and 33. The container units 21 will ordinarily be filled with the material 36 while the material is in a liquid state. When filling is completed, a process which is simplified by the low melting point of the material, a suitably formed filler opening may be closed by welding, thus permanently sealing the material from the external atmosphere. The material within the container will harden to its normal metallic state as indicated in the drawings. The units 21 contain the material 36 against escape and further serve as a protective casing inhibiting spontaneous reactions. The container materials will be of lesser specific heat than the material 36 and may be selected from number of metals in the iron and steel category which are considered suitable on account of their strength and resistance to wear and corrosion.

A feature of the units 21 is their ability to transmit braking pressure from the hydraulic unit 17 directly and without lost motion, irrespective of whether the material 36 is in a liquid or a solid state. Prior to melting, the materials 36, together with its casing comprising the parts 28, 31, 32 and 33 is, as is characteristic of metals, substantially incompressible. After melting, the material fills and may slightly extend the casing in which it is contained. As a result, lateral pressures exerted upon the surfaces 28 and 31 are transmitted through the unit substantially without dissipation within the unit.

Further, it will be understood that a unit 21, as it comprises the material 36, and an expansible container therefor, is a heat absorber of general utility. Such a unit might for example be fashioned in the form of a brake shoe selectively engageable with a braking surface to transform kinetic energy into heat and to absorb such heat into its own mass. Similarly, the unit might take the form of an annular tank or hub upon which a band selectively is tightened.

Also, it will be understood that while the invention has been disclosed as applied to brake mechanisms, it is applicable as well to other mechanical devices which in their use may generate excessive heat, for example friction clutches.

What is claimed is:

1. A heat absorbing frictional unit comprising an expansible container, and a normally solid heat absorbing material within said container filling said container when in a liquid state, said material changing from a solid to a liquid state in response to absorption of heat, said unit sustaining and transmitting pressures applied thereto in a substantially incompressible manner in either the liquid or solid state of said material.

2. A heat absorbing unit according to claim 1, characterized in that the container of said unit is shaped as a bellows with friction plates at the ends thereof and expansion fold means therebetween tending to contract upon the contained material, said plates and said fold means being interconnected to define a liquid tight pressure vessel.

3. A heat absorbing unit according to claim 2, characterized in that the contained material is lithium.

4. A heat generating assembly wherein relatively stationary and rotating elements are pressed frictionally together; characterized in that at least one of said elements is a lightly encased solid material having the properties of high conductance, high specific heat, low melting point and low pressure at operating temperatures, said one element being in the form of a flexible vessel filled with said material and operating in either the liquid or solid state of said material to sustain and transmit pressures in a substantially inflexible manner.

5. An assembly according to claim 4, characterized in that said one element is a vessel in the shape of a bellows filled with said material.

6. An assembly according to claim 4, characterized in that said material is lithium.

References Cited in the file of this patent

UNITED STATES PATENTS

| 1,026,274 | McGiffert | May 14, 1912 |
| 1,786,285 | Bissell | Dec. 23, 1930 |
| 1,876,917 | Gosslau | Sept. 13, 1932 |
| 1,878,566 | Woolson | Sept. 20, 1932 |
| 1,952,967 | Boughton | Mar. 27, 1934 |
| 1,990,882 | Sargent | Feb. 12, 1935 |
| 2,040,464 | Cameron et al. | May 12, 1936 |
| 2,051,286 | Boykin | Aug. 18, 1936 |
| 2,093,771 | Colwell | Sept. 21, 1937 |
| 2,152,489 | Lamb | Mar. 28, 1939 |
| 2,174,635 | Linderman | Oct. 3, 1939 |
| 2,254,074 | Klaue | Aug. 26, 1941 |
| 2,299,208 | Bloss | Oct. 20, 1942 |
| 2,342,211 | Newton | Feb. 22, 1944 |
| 2,407,197 | Watts | Sept. 3, 1946 |
| 2,537,174 | Townhill | Jan. 9, 1951 |

FOREIGN PATENTS

| 759,942 | France | Dec. 6, 1933 |
| 999,870 | France | Oct. 10, 1951 |
| 638,573 | Great Britain | June 14, 1950 |
| 701,725 | Great Britain | Dec. 20, 1953 |